(12) United States Patent
Abe et al.

(10) Patent No.: US 8,934,575 B2
(45) Date of Patent: Jan. 13, 2015

(54) RECEPTION METHOD AND RECEPTION DEVICE ESTIMATING RECEPTION QUALITY AND COMMUNICATION SYSTEM USING THE RECEPTION DEVICE

(75) Inventors: Katsuaki Abe, Kanagawa (JP); Masayuki Orihasi, Chiba (JP); Yutaka Murakami, Kanagawa (JP); Akihiko Matsuoka, Kanagawa (JP); Takenori Sakamoto, Tokyo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 2248 days.

(21) Appl. No.: 10/484,032

(22) PCT Filed: May 8, 2003

(86) PCT No.: PCT/JP03/05755
§ 371 (c)(1),
(2), (4) Date: Sep. 13, 2004

(87) PCT Pub. No.: WO03/096582
PCT Pub. Date: Nov. 20, 2003

(65) Prior Publication Data
US 2005/0007947 A1    Jan. 13, 2005

(30) Foreign Application Priority Data

May 9, 2002 (JP) .................................. 2002-134692
Apr. 30, 2003 (JP) .................................. 2003-125033

(51) Int. Cl.
  H04L 27/06 (2006.01)
  H04B 15/00 (2006.01)
  H04L 1/06 (2006.01)
  H04L 1/00 (2006.01)
  H04L 1/20 (2006.01)

(52) U.S. Cl.
  CPC ............... H04L 1/06 (2013.01); H04L 1/0001 (2013.01); H04L 1/0026 (2013.01); H04L 1/20 (2013.01)
  USPC ............ 375/316; 375/340; 375/346; 375/285

(58) Field of Classification Search
  USPC ............... 375/240.26, 240.27, 285, 295, 316, 375/346, 347, 348, 349, 219, 220, 221, 222, 375/240, 259, 324, 340, 341, 278, 254; 370/310, 314, 329, 330, 337, 335, 334, 370/333, 332, 344, 347, 478, 479, 48
  See application file for complete search history.

(56) References Cited

U.S. PATENT DOCUMENTS 4,835,790 A * 5/1989 Yoshida et al. ............... 375/227
5,204,856 A * 4/1993 Bebee et al. .................. 370/436

(Continued)

FOREIGN PATENT DOCUMENTS

| JP | 11-055206 | 2/1999 |
| JP | 2000-307544 | 11/2000 |

(Continued)

Primary Examiner — Sam K Ahn
Assistant Examiner — Linda Wong
(74) Attorney, Agent, or Firm — RatnerPrestia

(57) ABSTRACT

Variation in received signal qualities at positions in a frame is estimated so as to improve a communication quality. In communication from a transmitting station to a receiving station, a received signal quality is estimated per data position in a data frame received by the receiving station, thus to grasp situations of the received signal quality varied depending on a position which is caused by various factors of property deterioration in a process from transmitting communication data from the transmitting station to receiving it by the receiving station via a transmission path. Further, an estimating result is supplied to a data processing unit and used at a latter stage. The estimating result is notified to the transmitting station and arrangement of transmitting data is reconstructed on the transmitting station side. The arrangement of the transmitting data is properly changed in accordance with importance of the communication data. Further, the rearranged transmitting data is properly restored on the receiving station side, thereby obtaining received data and improving a quality of a communication service.

15 Claims, 11 Drawing Sheets

(56) References Cited

U.S. PATENT DOCUMENTS

| | | | |
|---|---|---|---|
| 6,389,066 B1* | 5/2002 | Ejzak | 375/224 |
| 6,452,936 B1* | 9/2002 | Shiino | 370/441 |
| 6,542,558 B1* | 4/2003 | Schulist et al. | 375/340 |
| 6,760,313 B1* | 7/2004 | Sindhushayana et al. | 370/252 |
| 6,891,897 B1* | 5/2005 | Bevan et al. | 375/265 |
| 7,164,649 B2* | 1/2007 | Walton et al. | 370/203 |
| 7,327,795 B2* | 2/2008 | Oprea | 375/260 |
| 2002/0034261 A1* | 3/2002 | Eidson et al. | 375/298 |
| 2002/0136287 A1* | 9/2002 | Heath et al. | 375/228 |

FOREIGN PATENT DOCUMENTS

| | | |
|---|---|---|
| JP | 2001-197044 | 7/2001 |
| JP | 2002-044051 | 2/2002 |
| WO | WO-00/69079 | 11/2000 |

\* cited by examiner

RECEPTION METHOD AND RECEPTION DEVICE ESTIMATING RECEPTION QUALITY AND COMMUNICATION SYSTEM USING THE RECEPTION DEVICE

BACKGROUND OF THE INVENTION

1. Field of the Invention

The present invention relates to a receiving method and a receiving apparatus for estimating the received signal quality, and a communication system using the receiving apparatus.

2. Description of the Prior Art

Various technologies are introduced to conventional communication systems, in particular, a radio communication system, for the purpose of the high efficiency of a transfer method and the increase in transfer capacity. For example, the abovementioned technologies include a multivalue modulating technology, e.g., a quadrature amplitude modulating (QAM) method serving as a modulating method, an orthogonal frequency division multiplexing (OFDM) method serving as a multiplexing method, punctured convolution coding which is obtained by combining convolution coding and punctured processing serving as codec processing, and turbo coding, and the like. Further, one of the abovementioned conventional technologies is disclosed in a book titled "WAVE SUMMIT COURSE (Ido Tsushin in Japanese)" written and edited by SASAOKA Shuichi and published by Ohmsha, Ltd. on Mar. 25, 1998.

Hereinbelow, a description is given of an example of the configuration and the operation of a receiving station in the conventional high-efficiency communication system with reference to FIG. 1. Here, it is assumed to use the punctured convolution coding as the codec processing, a 64-level QAM method whereby the signal point is arranged by a gray code as the modulating method, and the OFDM as the modulating method. A signal transmitted from a transmitting station 10 is subjected to the to the orthogonal frequency division multiplexing, and the resultant signal is received and demodulated by an OFDM receiving unit 21. Consequently, a receiving station 20 obtains a modulating result every sub-carrier. A multivalue-QAM demodulating unit 22 performs the 64-level QAM demodulation processing of the sub-carriers, thereby obtaining a demodulating result. The transmitting station 10 performs the so-called punctured convolution coding processing of transmitting data, that is, deletes data at a predetermined position thereof. Then, in a codec unit 23, a depuncturing processing portion 24 depunctures the data and thereafter a Viterbi decoding portion 25 Viterbi-decodes the data at the predetermined position which is subjected to the puncturing processing, thereby restoring the data transmitted from the transmitting station 10.

With the abovementioned configuration, the efficiency for frequency use is improved and the communication with a large capacity is possible between the transmitting station 10 and the receiving station 20.

When the communication capacity is highly efficient with the abovementioned configuration, various factors in the processing cause the communication quality to vary depending on the position of bit data in a frame. For example, the communication quality in the OFDM method varies depending on the position of the sub-carrier due to the property of a transmission path between the transmitting station 10 and the receiving station 20 and due to a deteriorating factor in an analog processing unit for filter processing and the like in the transmitting station 10 and the receiving station 20. Further, since the average distance between signal points of bits is essentially different in the reception and demodulation of the 64-level QAM with the arrangement of the signal points shown in FIG. 4, the obtained communication quality varies. Specifically, it is known that the qualities of bits $b_0$ and $b_1$ are the highest and the qualities of bits $b_4$ and $b_5$ are the lowers. Further, it is generally well-known that data is subjected to the interpolation processing of phase and amplitude by use of a previously-inserted well-known pilot symbol in the QAM demodulation and the data is subjected to the compensation of phase and amplitude. However, the symbol apart from the pilot symbol is not fully interpolated and the quality might deteriorate depending on the precision of interpolation processing. Further, a code through the punctured convolution coding might essentially vary the distance between the codes.

As mentioned above, since the communication quality might vary in the processing units, the communication qualities at the positions in a finally-obtained received data frame are not uniform and are varied. Generally, in order to reduce the variation in communication quality, the codec processing unit makes the communication quality uniform by combining the interleave processing and the error correction in many cases.

As the data communication using the above high-efficient transfer method, recently, the data is communicated by increasing use of the packet transfer of an IP (Internet Protocol) and the transfer of multi-media as upgrade transfer thereof, e.g., a moving image, audio information, and text information with the large capacity. It is assumed that moving image data through the MPEG coding is transferred. A data sequence generated by the coding contains various header portions (a sequence header and a picture header) and image data. (DCT coding data portion). The degree of influence upon decoding the image varies depending on the portions of the data sequence when an error is caused upon communication. Specifically, the occurrence of communication error at the sequence header portion or the picture header potion influences the entire sequence block and picture header portion, thus excessively deteriorating the image quality. However, the occurrence of the communication error in a DCT encoding data unit doe not exert the influence only on the DCT block. The encoding processing uses a variable code and, therefore, the occurrence of the communication error at the header portion in the data sequence does not enable the decoding of the subsequent portions up to the position at which the next start position of the well-known variable code is inserted and this exerts the serious influence on the image reading. The above-generated data sequence includes many services in which the influence on the quality of the communication service varies depending on the component of the data sequence.

In transmitting the data with the large capacity, the data sequence generated by the updating processing is basically generated regardless of the transfer method of a physical layer. Further, the data sequence is generally supplied to a processing system of the physical layer by a fixing method in accordance with a predetermined procedure, and the procedure is not dynamically changed. In this case, upon transmitting MPEG moving image data, data in header information portions (sequence header, picture header, etc.) with high influence on the original image quality is fixedly allocated at the position with the low quality in the physical layer, and the image quality is not fully obtained.

SUMMARY OF THE INVENTION

The present invention is devised in consideration of the above circumstances and it is an object of the present invention to provide a receiving method and a receiving apparatus for estimating the received signal quality per position in a frame received by a receiving station, and a communication system for notifying a transmitting station side of the received signal quality per position and for rearranging transmitting data on the transmitting station side by use of information on the received signal quality per position.

In order to solve the above problems, according to the present invention, there is provided a receiving method including: a step of estimating a received signal quality per position in a string of received data from a result of demodulating a received signal and of outputting a result of estimating the quality per position; and a received data processing step of processing the received data by use of the result of estimating the quality per position and the result of demodulating the received signal. Further, according to the present invention, there is provided a receiving apparatus which has means to realize the processing steps in the receiving method.

With the receiving method and receiving apparatus, it is possible to estimate the variation in received signal quality at positions in a frame, which is due to various property deteriorating factors in the process from the transmission of the communication data from the transmitting station to the reception in the receiving station via a transmission path. Further, it is possible to improve the quality of communication services by processing, e.g., for deleting data with the weighting of soft decision value according to the quality and at the position having excessively deteriorated quality in error correction processing and image decoding at the latter stage.

Further, according to the present invention, there is provided a communication system for transferring data from a first communication station to a second communication station, wherein the first communication station includes: data processing means which generate a string of transmitting data and simultaneously output importance information of the data; and data rearranging means which rearrange the sequence of the string of transmitting data and output the transmitting data frame based on the quality information per position notified from the second communication station, the string of transmitting data, and the importance information; and transmitting and modulating means which perform predetermined modulation processing of the transmitting data frame outputted from the data rearranging means and transmit it, and the second communication system includes: means for estimating quality per position which estimates received signal quality per position; means for notifying quality information per position which notify the first communication station of the quality information per position which is outputted from the means for estimating the quality per position; data arrangement information extracting means which extract the data arrangement information notified from the first station; and data arrangement restoring means which perform restoring processing of the arrangement of the string of receiving and demodulating data based on the extracted data arrangement information.

With the above configuration, it is possible to arrange the transmitting data with the higher importance information at the position with the higher communication reliability and communicate it in accordance with the variation in received signal quality depending on the in-frame position due to various factors in a down-link communication system. Consequently, the communication services are improved.

According to the present invention, it is possible to estimate the variation in received signal quality depending on the position in the frame which is caused by various property deteriorating factors in the processing from transmitting the transmitting data from the transmitting station to receiving the data by the receiving station via the transmission path, and to efficiently use the estimating result in the data processing unit at the latter stage. With the foregoing configuration and advantages, the levels of received signal qualities at the specific position in the frame can be detected and the data processing unit at the latter state can improve the precision of the processing based on the quality information. For example, the data with the low quality can be deleted. Further, it is possible to arrange the transmitting data with the higher importance information at the position with the higher communication reliability and communicate it in accordance with the variation in received signal quality depending on the in-frame position due to various factors in a down-link communication system. Thus, it is possible to improve a communication service.

In addition, in the communication from the transmitting station to the receiving station, a received signal quality is estimated every data position in a data frame received by the receiving station, thus to estimate situations of the received signal quality varied depending a position which is caused by various factors of property deterioration in a process from transmitting communication data from the transmitting station to receiving it by the receiving station via a transmission path. Further, an estimating result is supplied to a data processing unit and used at a latter stage. The estimated result is notified to the transmitting station and arrangement of the transmitting data is reconstructed on the transmitting station side. The arrangement of the transmitting data is properly changed in accordance with importance of the communication data. Furthermore, the rearranged transmitting data is properly restored on the receiving station side, thereby obtaining received data and improving a quality of a communication service.

DESCRIPTION OF THE PREFERRED EMBODIMENTS

Hereinbelow, a description is given of embodiments of the present invention with reference to the drawings.

(First Embodiment)

Figure 1:
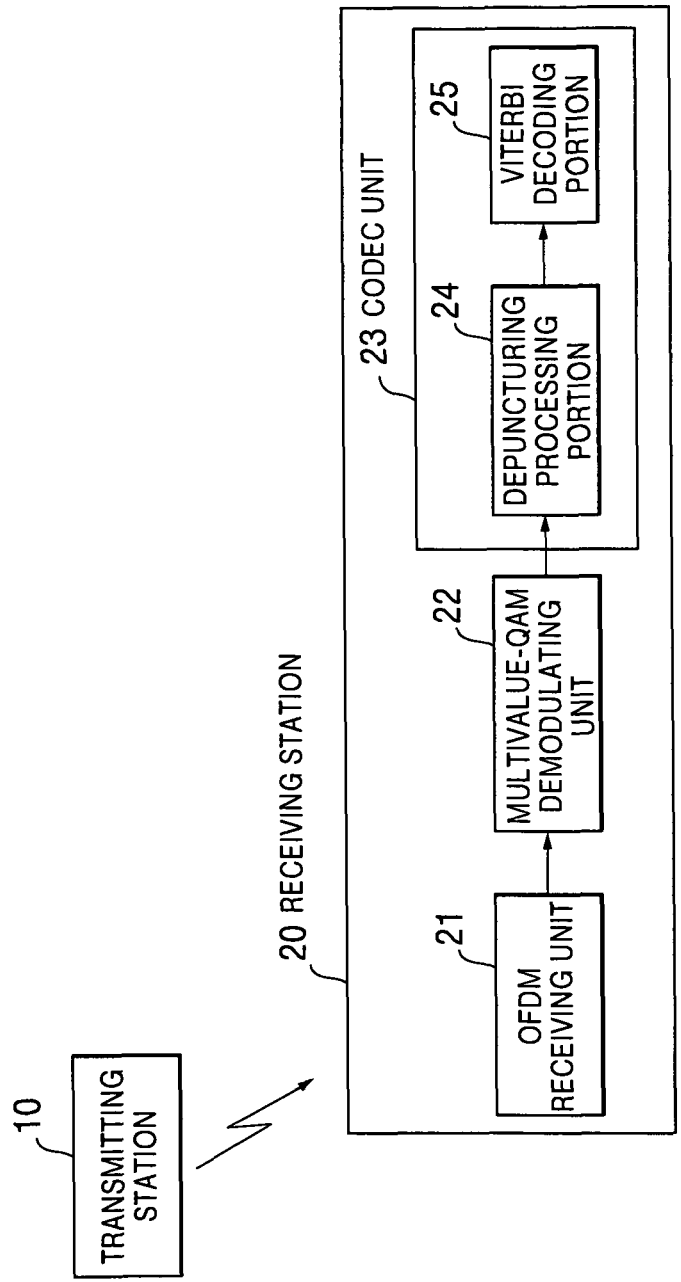
FIG. 1 is a block diagram showing one example of a conventional communication system.
Figure 2:
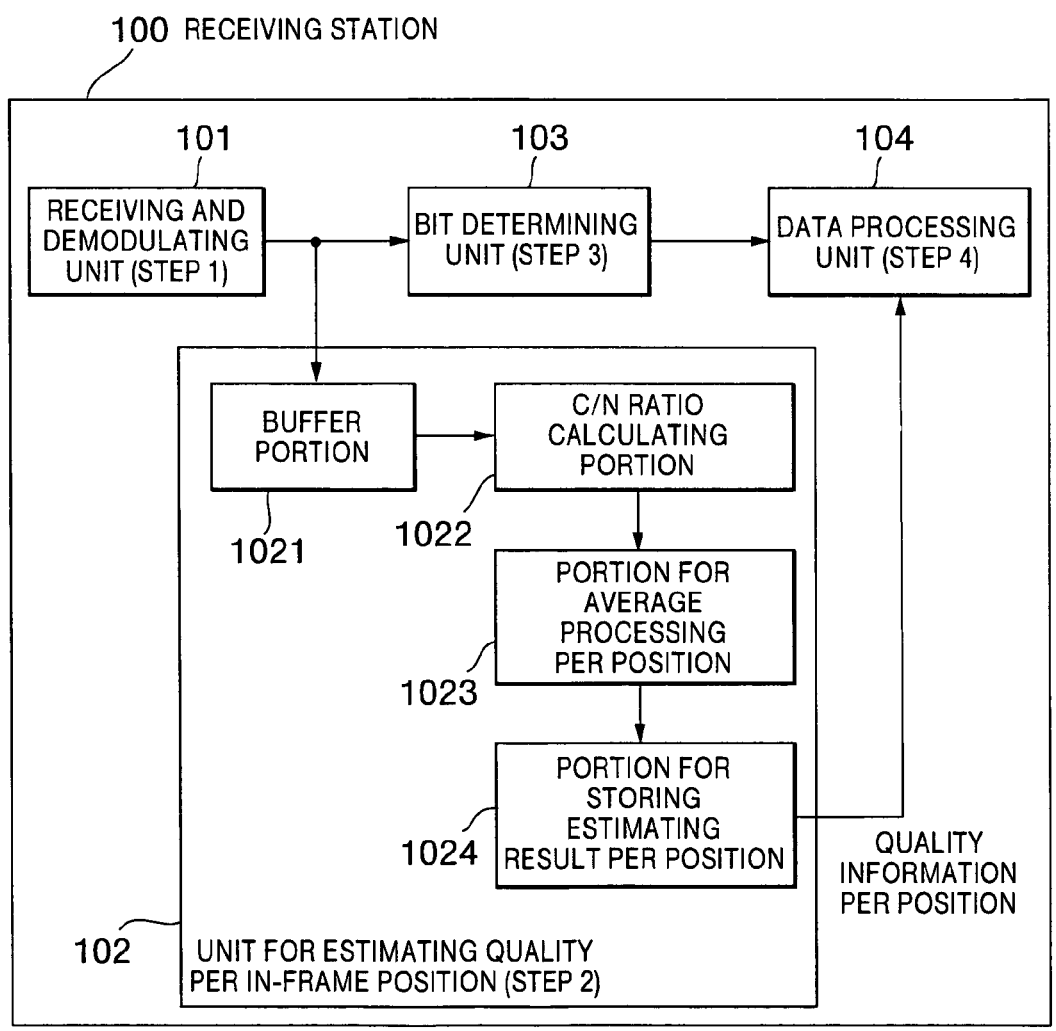
FIG. 2 is a block diagram showing one example of a receiving station according to the first embodiment of the present invention.

A first embodiment of the present invention will be described. FIG. 2 shows the configuration and the operation of a receiving station 100 according to the first embodiment. According to the first embodiment, the received signal quality is estimated per position in a received-data frame based on a receiving and estimating result of the receiving station 100, and an estimating result is obtained. Although a received signal is subjected to predetermined modulation processing, the modulating method is not limited. For example, the orthogonal frequency division multiplexing (hereinafter, referred to as the OFDM) is used. At each subcarrier in OFDM, 64-level QAM with gray coding is used. Communication data is transmitted based on a frame structure containing a predetermined number of pieces of data or a predetermined formats.

In the receiving station 100, a receiving and demodulating unit 101 receives and demodulates a modulated signal received based on the frame unit and outputs a receiving and demodulating result (step 1). According to the first embodiment, the OFDM processed signal is received and demodulated and a receiving and demodulating result $D_i$ ($d_{i,0}$, $d_{i,1}$, $d_{i,2}$, ..., $d_{i,N-1}$) is obtained. Here, symbol $d_{i,n}$ denotes a receiving and demodulating result of an (n-th) bit in an (i-th) frame and is expressed by an orthogonal IQ vector.

A unit 102 for estimating a quality per in-frame position estimates a received signal quality $Q_{ave}$ ($q_{a0}$, $q_{a1}$, $q_{a,2}$, ..., $q_{aN-1}$) per bit position in the frame by use of the receiving and demodulating result of the predetermined number of frames outputted from the receiving and demodulating unit 101 (step 2). According to the first embodiment, as one example of a parameter indicating the received signal quality, a receiving C/N ratio (ratio of carrier power to noise power) is estimated. The receiving C/N ratios per position in the frame are averaged by use of estimated received signal quality $Q_0$ to $Q_{99}$ in the past 100 frames. The unit 102 for estimating a quality per in-frame position includes: a buffer portion 1021; a C/N ratio calculating portion 1022; a portion 1023 for average processing per position; and a portion 1024 for storing the estimating result per position.

The buffer portion 1021 temporarily stores the receiving and demodulating result $D_i$ ($d_{i,0}$, $d_{i,1}$, $d_{i,2}$, ..., $d_{i,N-1}$) of each frame and reads it as needed.

The C/N ratio calculating portion 1022 calculates the C/N ratio per bit position in the frame by use of the receiving and demodulating result $D_i$ ($d_{i,0}$, $d_{i,1}$, $d_{i,2}$, ..., $d_{i,N-1}$) temporarily stored in the buffer unit 102. For example, the C/N ratio calculating portion 1022 calculates the average amplitude of the signal points and then calculates the carrier power by use of derived average amplitude in each frame by use of the receiving and demodulating result $d_{i,0}$ to $d_{i,N-1}$ and, thereafter, calculates the C/N ratio $Q_i$ ($q_{i,0}$, $q_{i,1}$, $q_{i,2}$, ..., $q_{di,N-1}$) per bit position in the frame by use of the receiving and demodulating result of the bit and the calculated average amplitude and carrier power.

The portion 1023 for average processing per position performs the average processing of the C/N ratio per in-frame position of the predetermined number of frames, by use of the result of calculating the C/N ratio per in-frame bit position. According to the first embodiment, the C/N ratio $Q_{ave}$ ($q_{a0}$, $q_{a1}$, $q_{a,2}$, ..., $q_{aN-1}$) per bit position is calculated by use of the C/N ratios $Q_0$ to $Q_{N-1}$ per bit position of the M past frames according to the following Formula (1).

$$q_{an} = \frac{1}{M} \sum_{i}^{M-1} q_{in} \qquad \text{Formula (1)}$$

The portion 1024 for storing the estimating result per position stores the estimated average C/N ratio per bit position, and outputs it as needed.

With the abovementioned configuration, the unit 102 for estimating a quality per in-frame position outputs the received signal quality per in-frame bit position (here, the receiving C/N ratio) as information on the quality per in-frame position.

A bit determining unit 103 determines the receiving bit by use of the orthogonal IQ vector $D_i$ outputted from the receiving and demodulating unit 101, and outputs a string of the received data (step 3).

A data processing unit 104 performs the data processing of layers upper than the so-called physical layer, by use of the string of received data (step 4). For example, error correction codec processing and decoding processing of speech and an image correspond to the data processing. In the data processing, the data is deleted or is weighted by use of the information on the quality per position in the receiving frame for the purpose of improving the communication reliability.

For example, in the case of using a soft decision value in the Viterbi decoding processing in the error correction codec processing, the bit with a deteriorated quality is weighted with low reliability of the soft decision value and, on the contrary, the bit with a high quality is weighted with high one by use of the information on the quality per in-frame position. Thus, more proper likelihood information can be supplied to the decoding processing unit and the reliability is improved.

In the case in which the bit position with excessively low quality exists, the bit position and its peripheral data portion are deleted in the decoding processing of the speech and the image and, consequently, it is possible to prevent the excessive deterioration in quality due to the decoding of the speech and image.

According to the first embodiment, in the process for transmitting the communication data from the transmitting station to the receiving station 100 via the transmission path, the unit 102 for estimating a quality per in-frame position estimates the deviation of the received signal quality per in-frame bit position which is caused by the various factors for deteriorating the property, and the data processing unit 104 at the latter stage effectively utilizes the deviation of the received signal quality. For example, the unit 102 for estimating a quality per in-frame position detects the specific position with the high received signal quality or the specific position with the low received signal quality, and the data processing unit 104 at the latter stage utilizes the detected quality information, thus improving the service quality.

According to the first embodiment, the unit 102 for estimating a quality per in-frame position estimates the received signal quality in the frame based on the bit unit. However, the unit of the above estimation is not limited to this, and may be not the bit unit but a symbol unit. Alternatively, the unit of the estimation may be a unit of block including a plurality of bits.

Further, according to the first embodiment, the receiving and demodulating result outputted from the receiving and demodulating unit 101 is expressed by the orthogonal IQ vector and the unit 102 for estimating a quality per in-frame position estimates the C/N ratio per bit position by use of the receiving and demodulating result. However, the present invention is not limited to this, and another parameter may be used for the receiving and demodulating result indicating the received signal quality. For example, in place of the receiving C/N ratio, a received bit error rate may be estimated and used. In this case, a method for estimating the receiving but error rate is not specifically limited. Therefore, the signal for estimating the bit error rate is not necessarily the receiving IQ vector, and may use a result of determining the bit. When the data transmitted from the transmitting station is subjected to the error correction coding processing, the receiving station may detect the bit error by use of the bit data before the corresponding error correction decoding processing and the string of data obtained by recoding the string of data after the error correction decoding.

The average value $Q_{ave}$ of the C/N ratio is used as the quality information per in-frame position and, however, it is not limited to this. For example, the received signal qualities may be classified into a plurality of ranks based on the average value $Q_{ave}$ of the C/N ratio and the obtained ranks and may be used as the quality information per position.

According to the first embodiment, the fast change of the environment of the transmission path is not considered in the transmitting station and the receiving station. However, the received signal quality may frequently be estimated according to the fast change of the transmission path.

(Second Embodiment)

Figure 3:
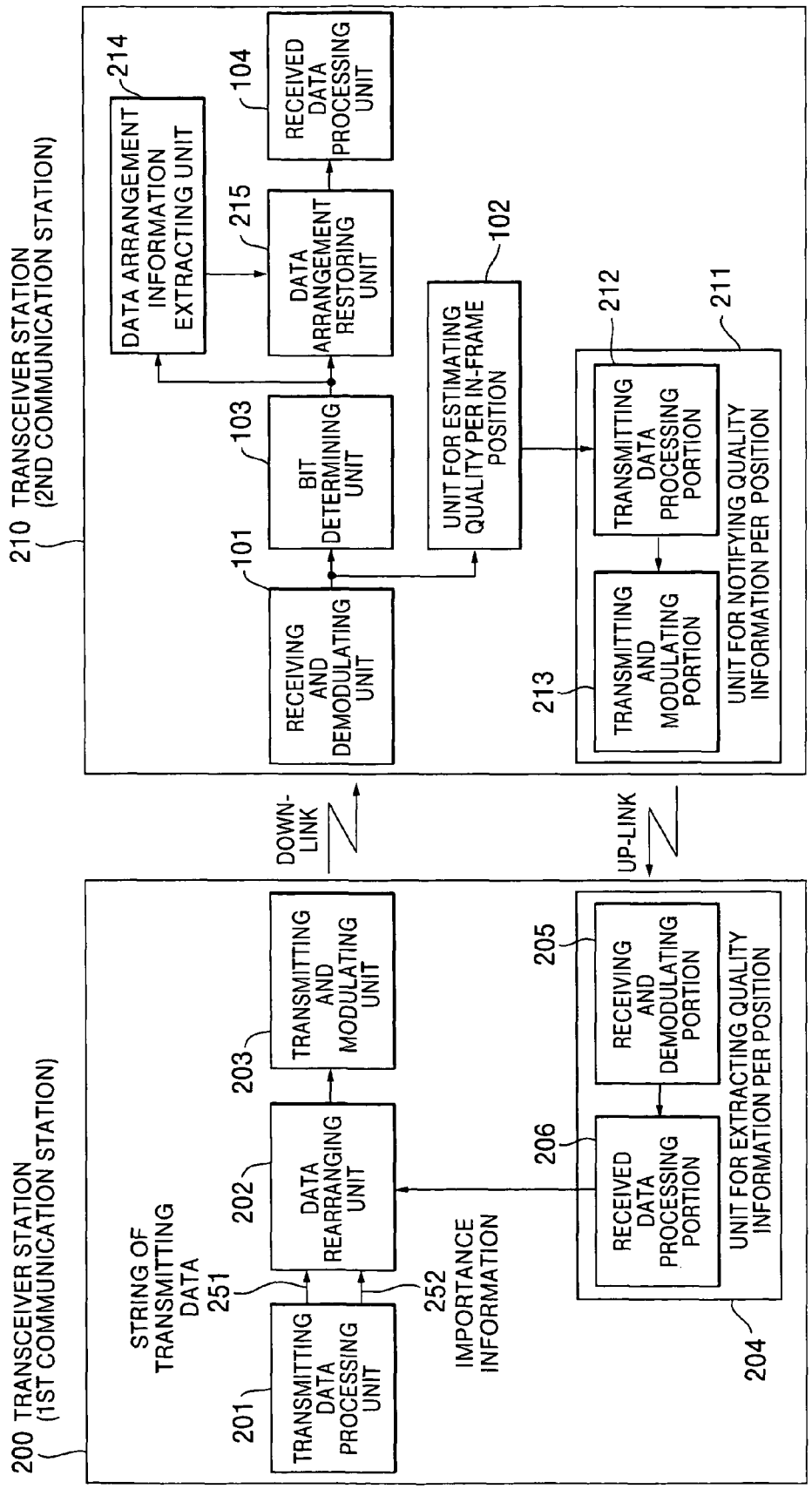
FIG. 3 is a block diagram showing one example of a communication system according to the second embodiment of the present invention.

Next, the second embodiment of the present invention will be described. FIG. 3 shows the configuration of a communication system according to the second embodiment. According to the second embodiment, the interactive communication is possible between a tranceiver station 200 as a first communication station and a tranceiver station 210 as a second communication station. In the communication from the transceiver station 200 to the transceiver station 210, a method for arranging the data in a communication frame is dynamically changed. A communication signal is subjected to predetermined modulation processing and, however, the modulating method is not limited according to the second embodiment. Here, the first modulation uses the 64-level QAM in which the signal points are arranged by the gray code and then the communication signal is subjected to the OFDM processing. According to the second embodiment, a communication link from the transceiver station 200 to the transceiver station 210 is referred to as a down-link, and a communication link from the transceiver station 210 to the transceiver station 200 is referred to as an up-link.

In the transceiver station 200, a transmitting data processing unit 201 generates the data transmitted through the down-link, outputs a generated string 251 of the transmitting data, and further outputs importance information 252 per portion in the generated string 251 of the transmitting data. Here, when the communication error is caused on the receiving side, a data portion with high importance denotes the data portion which excessively influences the quality of the communication service. For example, when the data is transmitted based on the IP (Internet Protocol), an IP header portion can be handled as the data portion with the high importance. Further, when the MPEG-coded moving image is transmitted as one service, the portion with the high importance corresponds to the portion which excessively influences the image quality due to the occurrence of error, such as the sequence header and picture header. Another portion is handed as the portion with the relatively low importance. In the case of using the variable code, the occurrence of communication error at the head portion in the string of data disables the restoring of sequent code data, thus exerting the serious influence on the deterioration in image quality. As a consequence, the data in the head direction of the string of data needs to have higher importance.

In the transmitting data processing unit 201, the string 251 of the transmitting data is transmitted by the IP or is transmitted as the MPEG moving image, the portion with the high importance corresponds to the IP header portion and various header portions in the MPEG coding data, and the importance information 252 is outputted to set another portion as the portion with the low importance.

A data rearranging unit 202 converts the sequence of the string 251 of the transmitting data, and rearranges and outputs it based on the inputted string 251 of the transmitting data, the importance information 252 per portion of the string 251 of the transmitting data, and information on the communication quality per bit position in the communication frame. Further, the data rearranging unit 202 outputs information on the rearrangement as the data arrangement information. Here, the data arrangement information indicates information for converting the sequence of the string 251 of the transmitting data generated by the transmitting data processing unit 201. One example of the information will be described later. The communication link used for the notification of the data arrangement information to the transceiver station 210 is not limited. According to the second embodiment, for example, the data arrangement information is inserted at a predetermined position and is transmitted with the rearranged string of transmitting data as a part of the modulated and transmitted string of transmitting data.

The data arrangement information may be notified to the transceiver station 210 via a communication channel for control information which is arranged independently of one for transmitting the data. Alternatively, the data arrangement information may be transmitted to the transceiver station 210 via a communication system (regardless of wiring and radio waves) different from a radio down-link communication system used here.

Further, according to the second embodiment, the rearrangement of the string of transmitting data in the unit 202 for rearranging the data is periodically updated and the updating processing is not frequent. For example, the rearrangement of the string of transmitting data in the rearranging data unit 202 is updated every 1,000 frames. The data arrangement information is outputted every time the data is updated.

A transmitting and modulating unit 203 performs predetermined modulation processing of the inputted string of transmitting data, and transmits it. According to the second embodiment, as mentioned above, the transmitting and modulating unit 203 performs the orthogonal frequency division multiplexing (hereinafter, referred to as the OFDM) of the string of transmitting data. It is assumed that the number of subcarriers in the OFDM is 32 as one segment, the interleave of data between the OFDM symbols is absent, a pilot symbol is inserted at the 8-subcarrier interval. Further, a description is given of the case in which the number of bits in one OFDM segment matches the number of bits in one frame.

A unit 204 for extracting the quality information per position extracts and outputs the quality information per position which is notified from the transceiver station 210. According to the second embodiment, the quality information per position is inserted in an up-link transmitting signal transmitted from the transceiver station 210 and, therefore, the unit 204 for extracting the quality information per position receives and demodulates the up-link transmitting signal and extracts the quality information based on the demodulating result. Further, the unit 204 for extracting-the quality information per position includes a receiving and demodulating portion 205 and a received data processing portion 206.

The receiving and demodulating portion 205 receives and demodulates the up-link signal transmitted from the transceiver station 210, and outputs a receiving and demodulating result. A communication method and a modulating method used by the up-link are not limited according to the present invention.

The received data processing portion 206 extracts and outputs the quality information per position notified from the transceiver station 210 based on the inputted receiving and demodulating result. The quality information per position and the inserting method thereof are described later together with the transceiver station 210. The quality information per position is inserted as a part of the string of transmitting data in the up-link and therefore the quality information per position is extracted and outputted from a predetermined position of the string of transmitting data.

The receiving and demodulating unit 101, the unit 102 for estimating a quality per in-frame position, the bit determining unit 103, and the received data processing unit 104 in the transceiver station 210 have the same configuration and operation as those according to the first embodiment. However, in the unit 102 for estimating a quality per in-frame position, the received signal qualities per in-frame position are classified into five ranks of A to E in order of the high quality, in place of the C/N ratio. The received signal quality is estimated by use of the string of the received data having a statically sufficient number of frames and, for example, by use of the string of the received data having 1,000 past frames. Hence, the results for estimating the quality per position are updated once based on 1,000 bursts.

A unit 211 for notifying the quality information per position notifies the transceiver station 200, of the information on the communication quality per in-frame position of the down-link signal received by the receiving and transmitting 210. The communication link used for notification of the quality information per position is not limited according to the present invention. According to the second embodiment, for example, the quality information per position is inserted in the transmitting data upon the up-link communication from the receiving and transmitting 210 to the transceiver station 200 and is notified, with the configuration of the transmitting data processing portion 212 and the transmitting and modulating portion 213. The transmitting data processing portion 212 generates the data to be transmitted by the up-link and forms the transmitting data frame. In particular, as mentioned above, the transmitting data processing portion 212 inserts, as a part of the transmitting data, the quality information per position in the frame of the down-link signal. The contents of other transmitting data are not limited according to the present invention. The transmitting and modulating portion 213 performs predetermined transmission modulation processing of the string of transmitting data. The unit 211 for notifying the quality information per position is not limited to the present configuration and, for example, may transmit only the control information by the up-link via a specific channel. Alternatively, the unit 211 for notifying the quality information per position may use a communication link different from the radio up-link (regardless of wiring and radio waves).

A data arrangement information extracting unit 214 extracts the data arrangement information upon rearranging the string of transmitting data by the data rearranging means in the transceiver station 200. According to the second embodiment, the data arrangement information and the string of transmitting data of the down-link are inserted and transmitted and, therefore, are extracted from a predetermined position in the string of the received data.

A data arrangement restoring unit 215 inputs the data arrangement information and the string of the received data, and rearranges the sequence of the string of the received data based on the data arrangement information, thereby restoring the sequence of the data string similarly to the case of the transmitting data.

Figure 4:
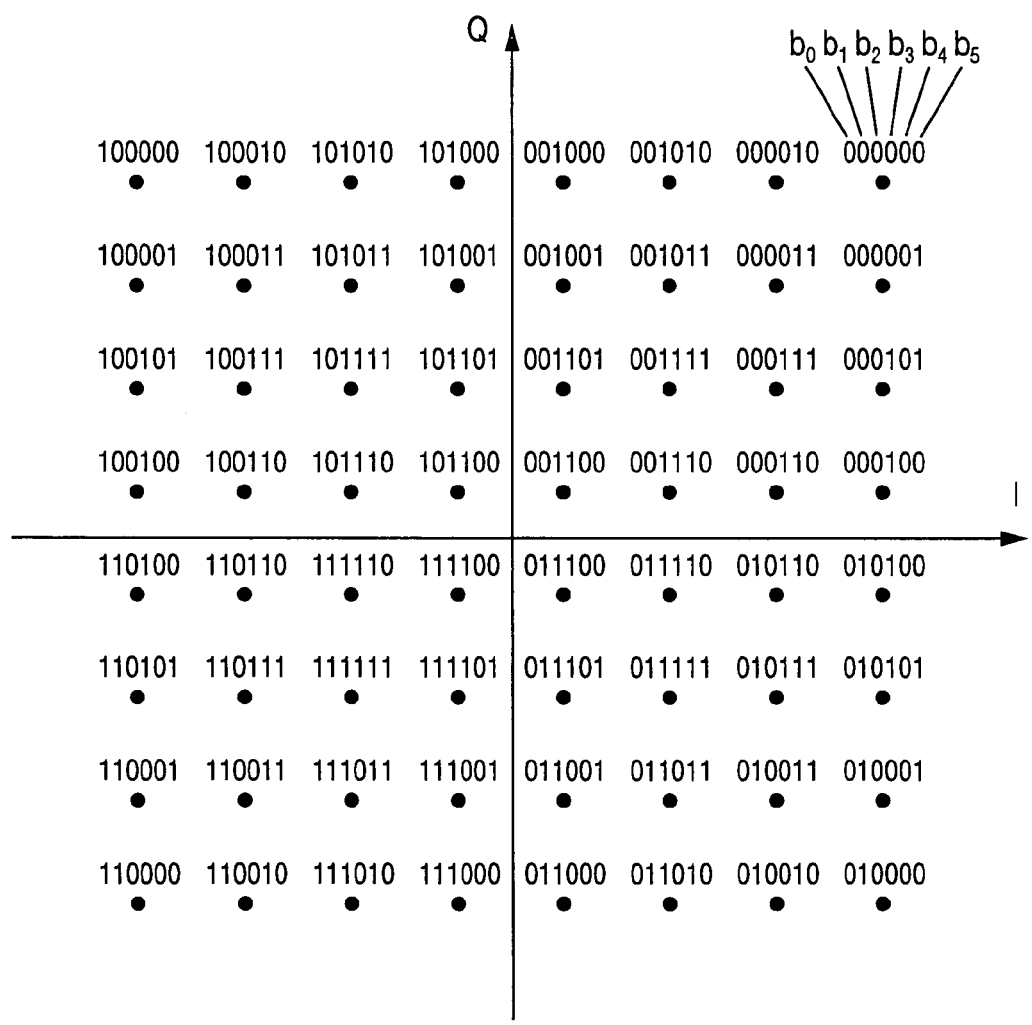
FIG. 4 is a diagram showing one example of the arrangement of 64-level QAM signal points according to the second embodiment.

Next, a description is given of the operation for improving the quality of the communication service in the down-link between the transceiver station 200 and the transceiver station 210 with the abovementioned configuration. The transceiver station 210 receives and demodulates the transmitting down-link signal transmitted from the transceiver station 200, and obtains a receiving and demodulating result. According to the second embodiment, the down-link signal is subjected to the first modulation by the 64-level QAM, and the OFDM processed signal is received and demodulated. The received signal qualities vary depending on the receiving bit due to various factors upon reception and demodulation. For example, the 64-level QAM is used in the first modulation, however, the received signal quality of 6 bits allocated to one symbol varies depending on the difference in average distance between the signal points. When the 64-level QAM is used with the arrangement of the signal points as shown in FIG. 4, the received signal qualities of bits $b_0$ and $b_1$ are the most preferable among those of bits $b_0$ to $b_5$, and those of the bits $b_4$ and $b_5$ are most deteriorated.

Figure 5:
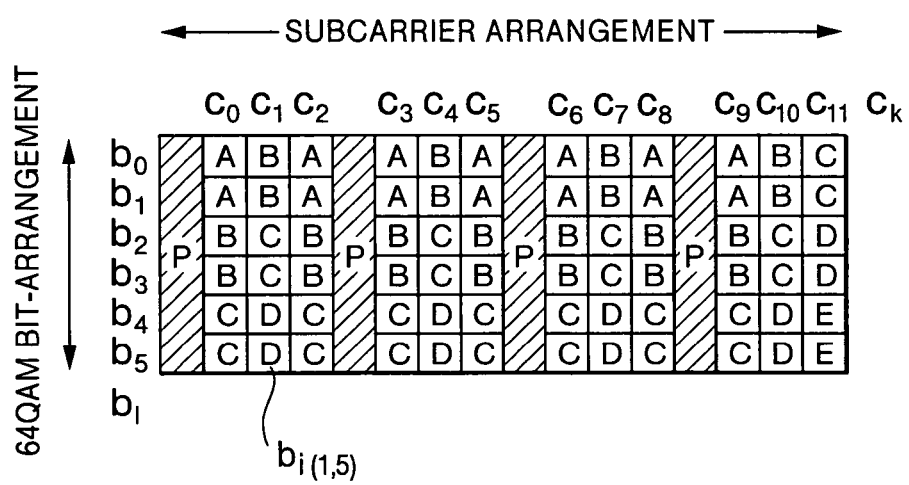
FIG. 5 is a diagram showing one example of the received signal quality obtained in one OFDM-segment according to the second embodiment of the present invention.
Figure 6:
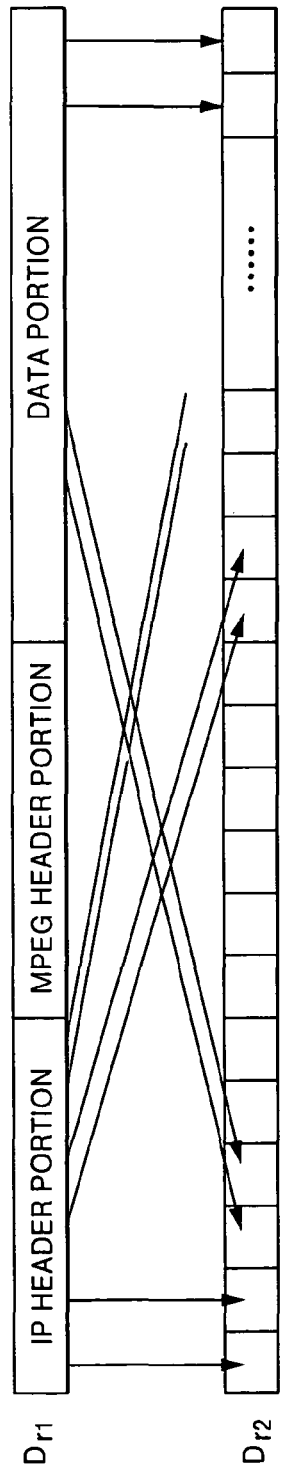
FIG. 6 is a diagram showing one example of a result of estimating the quality per position in a frame and the data rearrangement according to the second embodiment.

When the OFDM is used and the phase and amplitude compensation is performed through the interpolation processing using the pilot symbol upon demodulation, the received signal quality of the subcarrier apart from the pilot symbol is relatively deteriorated because the precision of the phase and amplitude compensation is degraded. Further, the receiving property might be deteriorated near the center of spectrums or near the outer edge depending on the property of an analog processing unit in the receiving and transmitting units 210 and 200. Under such a circumstance, the distribution of received signal quality is assumed as shown in FIG. 5 upon expressing the receiving property of the bits in the subcarriers of the OFDM by five ranks of A to E. Referring to FIG. 5, the ordinate denotes the 6 bits per 64-level QAM symbol in each subcarrier, and the abscissa denotes the subcarrier position. It is assumed that the pilot symbol is inserted in the subcarrier at a position p in FIG. 5. Here, it is assumed that the OFDM demodulated signal arranged as shown in FIG. 5 is obtained as a string $D_i(d_{i,m})$ of the receiving bit data in the sequence shown in FIG. 6. The unit 102 for estimating a quality per in-frame position obtains a received signal quality $q_{nm}$ at a position m in the frame by use of the string ($D_0$ to $D_{999}$) of the past frames (corresponding to the 1,000 bursts according to the second embodiment) as shown in FIG. 6.

The obtained quality information $Q_{ave}$ per position is transmitted as the up-link transmitting data by the transmitting data processing portion 212, and forms the frame together with other transmitting data. Further, the transmitting and modulating portion 213 transmits the frame to the transceiver station 200 by the up-link.

In the transceiver station 200, a receiving and demodulating portion 205 receives and demodulates the up-link transmitting signal, and the received data processing portion 206 extracts the quality information $Q_{ave}$ per position from the received and demodulated signals and supplies the extracted information to the data rearranging unit 202. The data rearranging unit 202 receives the string of transmitting data generated by the transmitting data processing unit 201 and the importance information per portion of the string of transmitting data. According to the second embodiment, the data rearranging unit 202 receives, as the string of transmitting data, the information on the MPEG-coded moving image on the IP packet. A string $D_{T1}$ of data is classified into three categories of an IP header portion, an MPEG-coded control information portion, and a coded data portion. With respect to the importance, the IP header portion is the most important, the MPEG-coded control information portion is secondarily important, and the coded data portion is the least important. The data rearranging unit 202 arranges the transmitting data in the IP header portion which is treated as the most important information at the position of the A rank of the quality, based on the quality information per position obtained from the transceiver station 210. In this case, the string $D_i$ of data is sequentially arranged in the sequence of $d_{i,0}$, $d_{i,1}$, $d_{i,12}$, $d_{i,13}$, .... When the A-rank position does not exist, the data is arranged at the position with the lower quality rank in the sequence of the B rank, C rank, .... When the data in the IP header portion is completely arranged, the MPEG control information with the secondarily high importance is arranged. Finally, the coded data portion with the lowest importance is arranged. The last coded data portion with the lowest importance is arranged at positions of bits $d_{i,70}$ and $d_{i,71}$ in the E rank. In particular, the MPEG coding uses the variable code upon encoding and therefore the end data in the string of codes is not influenced on the decoding due to the receiving error very much. Thus, if the last data is arranged at the E-rank position, advantageously, the influence on the decoding is reduced.

As mentioned above, the data rearranging unit 202 rearranges the transmitting data, obtains the rearranged string $D_{T2}$ of the data, and generates information R on the data arrangement. The information R on the data arrangement is notified to the transceiver station 210 together with the string $D_{T2}$ of transmitting data via the down-link. According to the second embodiment, the information R on the data arrangement is updated in accordance with the updating the quality information per position notified via the up-link. As mentioned above, since the quality information per position is updated at the extremely long interval of frames, the quality information per position may be notified to the transceiver station 210 in accordance with the updating frequency.

In the communication system according to the second embodiment, the transmitting data with the higher importance is arranged at the position having high communication reliability and is communicated in accordance with the variation in received signal quality depending on the in-frame position which is caused by various factors in the down-link communication system. Thus, the communication service is improved.

According to the second embodiment, the codec processing such as the error correction coding in the down-link communication is not described. Because the present invention is not limited by the codec processing. When the codec processing is performed, the transmitting and modulating unit 203 may perform the codec processing or the transmitting data processing unit 201 may perform the codec processing. In this case, the data rearranging unit 202 may perform the interleave processing in the codec processing and an interleave pattern may dynamically be changed.

The receiving and demodulating unit 101 may perform the codec processing of the received data in the second communication station, the data arrangement restoring unit 215 may perform the deinterleave processing in the codec processing.

Further, the data arrangement information extracting unit 214 may set a deinterleave pattern based on the data arrangement information notified from the transceiver station 200.

The quality information per position is notified to the transceiver station 200 via the up-link and, however, the present invention is not limited to this. As will be described later as an example according to the fourth embodiment, the quality information per position may be notified via another communication link.

The quality is expressed by the five ranks of A to E as the quality information per position. However, the present invention is not limited to the above quality information per position. Different ranks may be used as ranks of the quality information per position, or the receiving C/N ratio or estimating value of the BER may be used as described according to the first embodiment.

The unit 102 for estimating a quality per in-frame position uses the receiving and demodulating result of the 1,000 past bursts upon estimating the quality. However, the 1,000 bursts are described as one example, and the present invention is not limited to this. The number of frames for estimation may be changed depending on the applied system. In particular, according to the second embodiment, the communication link between the transmitting station and the receiving station does not consider the situation in which the environment of the transmission path is fast changed. However, if the frequency of quality estimation, the notifying frequency of the quality information per position in the up-link, and the updating frequency of the rule for rearranging the data are higher, the present invention can be applied to the environment which is not largely changed by the unit of the frame length.

In the processing for rearranging the string of transmitting data in the data rearranging unit 202, the data in the frame is rearranged based on the bit unit, and the data arrangement information per bit is notified to the transceiver station 210. However, the present invention is not limited to this. For example, the string of transmitting data may be rearranged based on the block unit containing a plurality of bits and the data arrangement information may be notified based on the block unit. Alternatively, a plurality of types of rearranging patterns may previously be provided and the best pattern may be selected. In this case, only the data arrangement information indicating the selected arranging pattern may be outputted and may be notified to the transceiver station 210.

Further, according to the second embodiment, for the purpose of a brief description, the number of bits in the one OFDM-segment, the number of bits in the IP packet, and the number of bits in one frame are similar. However, the present invention is not limited to this and the number of pieces of data necessarily does not match each other between the OFDM segment and the IP packet.

In addition, according to the second embodiment, the data is arranged at the E-rank position with the lowest importance. However, the data may not be arranged at the position with the low received signal quality in the frame.

(Third Embodiment)

Figure 7:
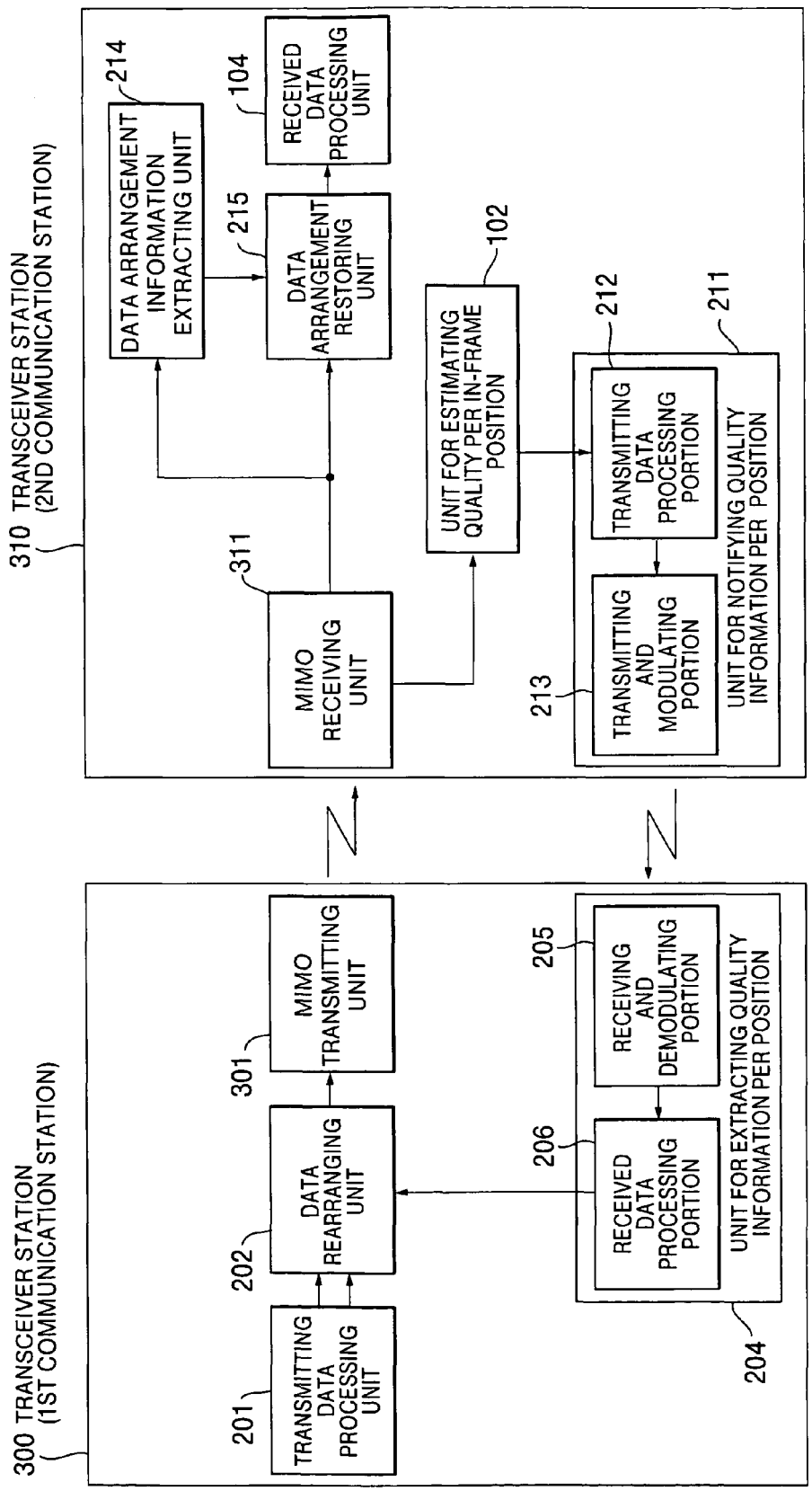
FIG. 7 is a block diagram showing one example of a communication system according to the third embodiment of the present invention.

Next, a description is given of the third embodiment of the present invention with reference to FIG. 7. FIG. 7 shows a communication system according to the third embodiment of the present invention. According to the third embodiment, the interactive communication is executed between a transceiver station 300 as a first communication station and a transceiver station 310 as a second communication station. In the communication from the transceiver station 300 to the transceiver station 310, an MIMO (Multi-Input Multi-Output) communication channel is used. The configuration of the transceiver station 300 is basically the same as that of the transceiver station 200 as shown in FIG. 3. Unlike the transceiver station 200, the transceiver station 300 includes an MIMO transmitting unit 301, in place of the transmitting and modulating unit 203. Further, the configuration of the transceiver station 310 is basically the same as that of the transceiver station 210 as shown in FIG. 3. Unlike the transceiver station 210, the transceiver station 310 includes an MIMO receiving unit 311, in place of the receiving and demodulating unit 101 and the bit determining unit 103. The rest of the configuration shown in FIG. 7 is the same as that shown in FIG. 3. Therefore, the same components as those in FIG. 3 are designated by the same reference numerals, a repeated description is omitted, and only the MIMO transmitting unit 301 and the MIMO receiving unit 311 are described in detail hereinbelow.

Figure 8:
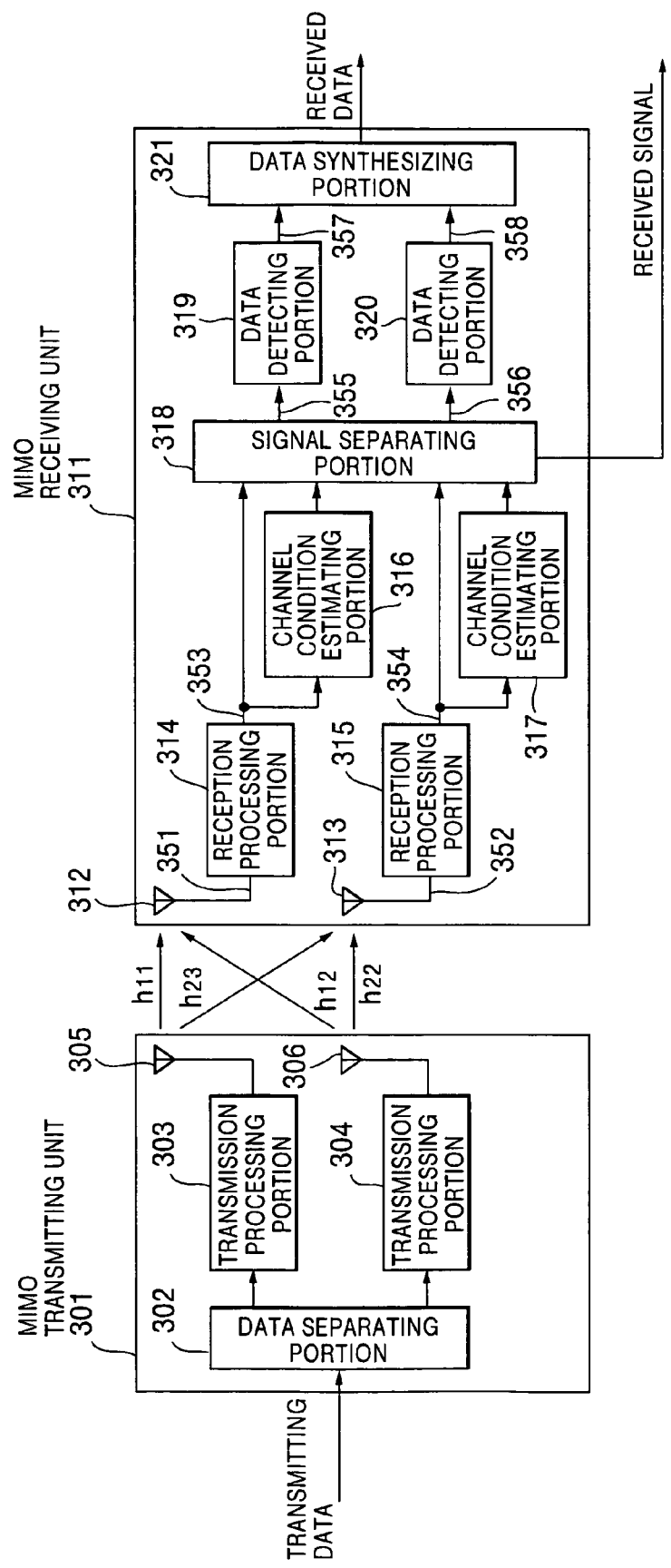
FIG. 8 is a block diagram showing one example of an MIMO transmitting unit and an MIMO receiving unit according to the third embodiment.

The MIMO transmitting unit 301 transmits the transmitting data to the transceiver station 310, from a plurality of antennas by use of a plurality of transmitting channels, and the configuration of the MIMO transmitting unit 301 is shown in FIG. 8. Further, the MIMO transmitting unit 301 includes: a data separating portion 302; transmission processing units 303 and 304, and transmitting antennas 305 and 306.

The MIMO receiving unit 311 receives, by a plurality of antennas, the signal transmitted from the MIMO transmitting unit 301 in the transceiver station 300, separates and detects the mixed signals from the estimated result of the property of propagation path, and outputs the obtained received data. The configuration of the MIMO receiving unit 311 is as shown in FIG. 8, and the MIMO receiving unit 311 includes: receiving antennas 312 and 313; reception processing units 314 and 315; channel condition estimating units 316 and 317; a signal separating portion 318; data extracting units 319 and 320; and a data synthesizing portion 321.

Referring to FIG. 8, the data separating portion 302 in the MIMO transmitting unit 301 separates and outputs the inputted transmitting data to a plurality of systems based on a predetermined rule. According to the third embodiment, the number of transmitting channels is two in the MIMO transmitting unit 301 and the data separating portion 302 separates and outputs the transmitting data into two channels. Further, according to the predetermined rule, the inputted signal is alternatively separated and outputted. However, the foregoing is one example and the present invention is not limited to the separating rule.

The transmission processing portion 303 outputs a high-frequency signal obtained by predetermined transmission and modulation processing of the inputted transmitting data. The transmission processing unit 304 performs the predetermined transmission and modulation processing of the inputted transmitting data, and outputs the obtained high-frequency signal. The carrier frequency of the transmitting signal from the transmission processing portion 303 is the same as that of the transmission processing unit 304, or is identical thereto. The transmission processing units 303 and 304 modulate the signal by 16-value QAM as the modulating method.

The transmitting antenna 305 transmits the transmitting signal outputted from the transmission processing portion 303. The transmitting antenna 306 transmits the transmitting signal outputted from the transmission processing unit 304.

In the MIMO receiving unit 311, the receiving antenna 312 supplies the received high-frequency signal to the reception processing portion 314. The receiving antenna 313 supplies the received high-frequency signal to the reception processing portion 315.

The reception processing portion 314 selects the signal transmitted by the MIMO transmitting unit 301 from an inputted high-frequency signal 351, performs predetermined frequency conversion and amplification processing of the selected signal, and outputs an obtained received signal 353. The reception processing portion 315 selects the signal transmitted from the MIMO transmitting unit 301 from an inputted high-frequency signal 352, performs predetermined frequency conversion and amplification processing, and outputs an obtained received signal 354.

The channel condition estimating portion 316 estimates the channel conditions which equivalently denotes the propagation characteristics between the MIMO transmitting unit 301 and the MIMO receiving unit 311, by use of the supplied received signal 353, and will be described in detail later. The channel condition estimating portion 317 estimates the equivalent property of the propagation path from the MIMO transmitting unit 301 to the receiving antenna 313 in the MIMO receiving unit 311, by use of a supplied received signal 354, and will be described in detail later.

The signal separating portion 318 separates plural-channel transmitting signals from the MIMO transmitting unit 301, by use of the received signals 353 and 354 obtained via plural receiving systems and results of estimating the property of the propagation path obtained by the channel condition estimating units 316 and 317. The operation of the signal separating portion 318 will be described in detail later. According to the third embodiment, the MIMO transmitting unit 301 transmits and outputs two-channel signals and therefore the two-system signals are separated.

The data detecting portion 319 determines the bits of the received signal and outputs the determined result by use of one signal 355 separated by the signal separating portion 318. The data detecting portion 320 determines the bit of the received signal and outputs the determined result by use of another signal 356 separated by the signal separating portion 318. According to the third embodiment, the signals from the transmission processing units 303 and 304 are modulated by the 16-value QAM and are transmitted. Therefore, in the bit determination, the signal point through the 16-value QAM is detected based on the position of the received signal on the IQ plane, and the string of receiving bits is obtained based on the detecting result.

The data synthesizing portion 321 synthesizes the string of inputted two-system bit data based on a predetermined rule, and outputs the string of one-system bit data. The synthesizing rule corresponds to the separating rule of the data separating portion 302 in the MIMO transmitting unit 301. According to the third embodiment, strings 357 and 358 of two-system bit data are alternatively synthesized and outputted.

The method for modulating the signal transmitted from the antennas of the MIMO transmitting unit 301 is not specifically limited in the present invention. According to the third embodiment, the 16-value QAM modulated signal is outputted from the antennas as one example.

In the configuration shown in FIG. 8, the amplitude and phase conditions of the propagation path from the transmitting antenna 305 to the receiving antenna 312 are equivalently expressed by a propagation constant $h_{11}$. Similarly, the amplitude and phase conditions of the propagation path from the transmitting antenna 306 to the receiving antenna 312 are expressed by a propagation constant $h_{12}$, the amplitude and phase conditions of the propagation path from the transmitting antenna 305 to the receiving antenna 313 are expressed by a propagation constant $h_{21}$, and the amplitude and phase conditions of the propagation path from the transmitting antenna 306 to the receiving antenna 313 are expressed by a propagation constant $h_{22}$. In this case, reference numeral $Tx_1$ denotes the signal transmitted from the transmitting antenna 305, and reference numeral $Tx_2$ denotes the signal transmitted from the transmitting antenna 306. Reference numeral $Rx_1$ denotes the signal received by the receiving antenna 312, and reference numeral $Rx_2$ denotes the signal received by the receiving antenna 313. The signals $Tx_1$, $Tx_2$, $Rx_1$, and $Rx_2$ have a relationship expressed by the following formula (2).

$$\begin{pmatrix} Rx_1 \\ Rx_2 \end{pmatrix} = \begin{pmatrix} h_{11} & h_{12} \\ h_{21} & h_{22} \end{pmatrix} \begin{pmatrix} Tx_1 \\ Tx_2 \end{pmatrix} \quad \text{Formula (2)}$$

The operation different from that according to the second embodiment is described hereinbelow among the operations for improving the quality of communication services in the down-link between the transceiver station 300 and the transceiver station 310 with the abovementioned configuration.

The MIMO transmitting unit 301 separates the data to be transmitted to the transceiver station 310 by the transmitting data separating portion 302 according to a predetermined rule. Through various modulation processing, the data is outputted from the transmitting antennas 305 and 306. The transmitted signals pass through propagation paths which equivalently express the conditions by the propagation constants $h_{11}$, $h_{12}$, $h_{21}$, and $h_{22}$. Further, the signals are received by the receiving antennas 312 and 313 of the MIMO receiving unit 311 in the transceiver station 310.

The receiving antenna 312 in the MIMO receiving unit 311 receives a signal 351 which contains both a signal transmitted from the transmitting antenna 305 under the influence equivalent to the propagation constant $h_{11}$ via the propagation path and a signal transmitted from the transmitting antenna 306 under the influence equivalent to the propagation constant $h_{12}$ via the propagation path. On the other hand, the receiving antenna 313 receives a signal 352 which contains both a signal transmitted from the transmitting antenna 305 under the influence equivalent to the propagation constant $h_{21}$ via the propagation path and a signal transmitted from the transmitting antenna 306 under the influence equivalent to the propagation constant $h_{22}$ via the propagation path. The received signal 351 is subjected to the frequency conversion, the frequency selection, and the amplification processing in the reception processing portion 314. An obtained signal 353 is supplied to the signal separation processing portion 318, and the channel condition estimating portion 316 estimates the propagation properties of the propagation paths from the transmitting antennas, that is, the propagation constants $h_{11}$ and $h_{12}$. Further, the estimating results are supplied to the signal separation processing portion 318. Similarly, the received signal 352 is subjected to the frequency conversion, the frequency selection, and the amplification processing in the reception processing portion 315. An obtained signal 354 is supplied to the signal separation processing portion 318, and the channel condition estimating portion 317 estimates the propagation properties of the propagation paths from the transmitting antennas, that is, the propagation constants $h_{12}$ and $h_{22}$. The estimating results are supplied to the signal separation processing portion 318.

The signal separation processing portion 318 separates components of the transmitting signal $Tx_1$ and components of the transmitting signal $Tx_2$ in the MIMO transmitting unit 301 by use of the signals 353 and 354 and the results of estimating the propagation properties supplied from the channel condition estimating units 316 and 317. Various methods of the separation processing have variously been disclosed. For example, as shown by the following formulae (3) and (4), the components in the transmitting signals are separated by processing for obtaining an inverse matrix H' of a channel condition matrix H using the propagation constants $h_{11}$, $h_{12}$, $h_{21}$, and $h_{22}$.

$$H = \begin{pmatrix} h_{11} & h_{12} \\ h_{21} & h_{22} \end{pmatrix} \quad \text{Formula (3)}$$

$$\begin{pmatrix} Tx_1 \\ Tx_2 \end{pmatrix} = H'^x \begin{pmatrix} Rx_1 \\ Rx_2 \end{pmatrix} \quad \text{Formula (4)}$$

It is known that, in the MIMO communication system, the signal cannot be separated with excessively high precision depending on the condition of the propagation path under the influence from noises. Under the abovementioned condition of the propagation path, the quality per bit position excessively varies due to the foregoing factors. Not under the above condition, when the transmitting data is assigned to the amplitude components by the linear modulation such as the 16-value QAM, the signals are easily influenced by the non-linear property of the amplification upon reception. In this case, as stated above according to the first and second embodiments, the received signal quality is estimated per in-frame position of the string of received data, the estimating result is notified to the transceiver station 300 by the up-link, the transmitting data is rearranged based on the notifying result, and the rearranged data is transmitted by the down-link. Thus, important data in the transmitting data is arranged and transmitted to the position of the bit with the strong error-resistance.

As mentioned above, according to the third embodiment, in the receiving and transmitting system with the MIMO configuration, the transmitting data with the higher importance is arranged at the position with the high communication reliability and is communicated in accordance with the variation in received signal quality caused depending on the in-frame positions due to the various factors and, thus, the communication service is improved.

According to the third embodiment, the configuration of the MIMO transmitting unit 301 is shown in FIG. 8 as one example of the MIMO transmitting unit. However, the present invention is not limited to this. For example, the numbers of the transmitting antennas and the transmission processing units are not limited to 2 and they may be 3 or more. Similarly, the configuration of the MIMO receiving unit 311 is shown in FIG. 8 as one example of the configuration of the MIMO receiving unit. However, the present invention is not limited to this. For example, the numbers of the receiving antennas and the reception processing units are not limited to 2 and they may be 3 or more and may not be the same number as that of the MIMO transmitting units 301.

Further, according to the third embodiment, the configuration of the up-link communication system is not specifically described. The up-link communication system necessarily does not have the MIMO configuration.

(Fourth Embodiment)

Figure 9:
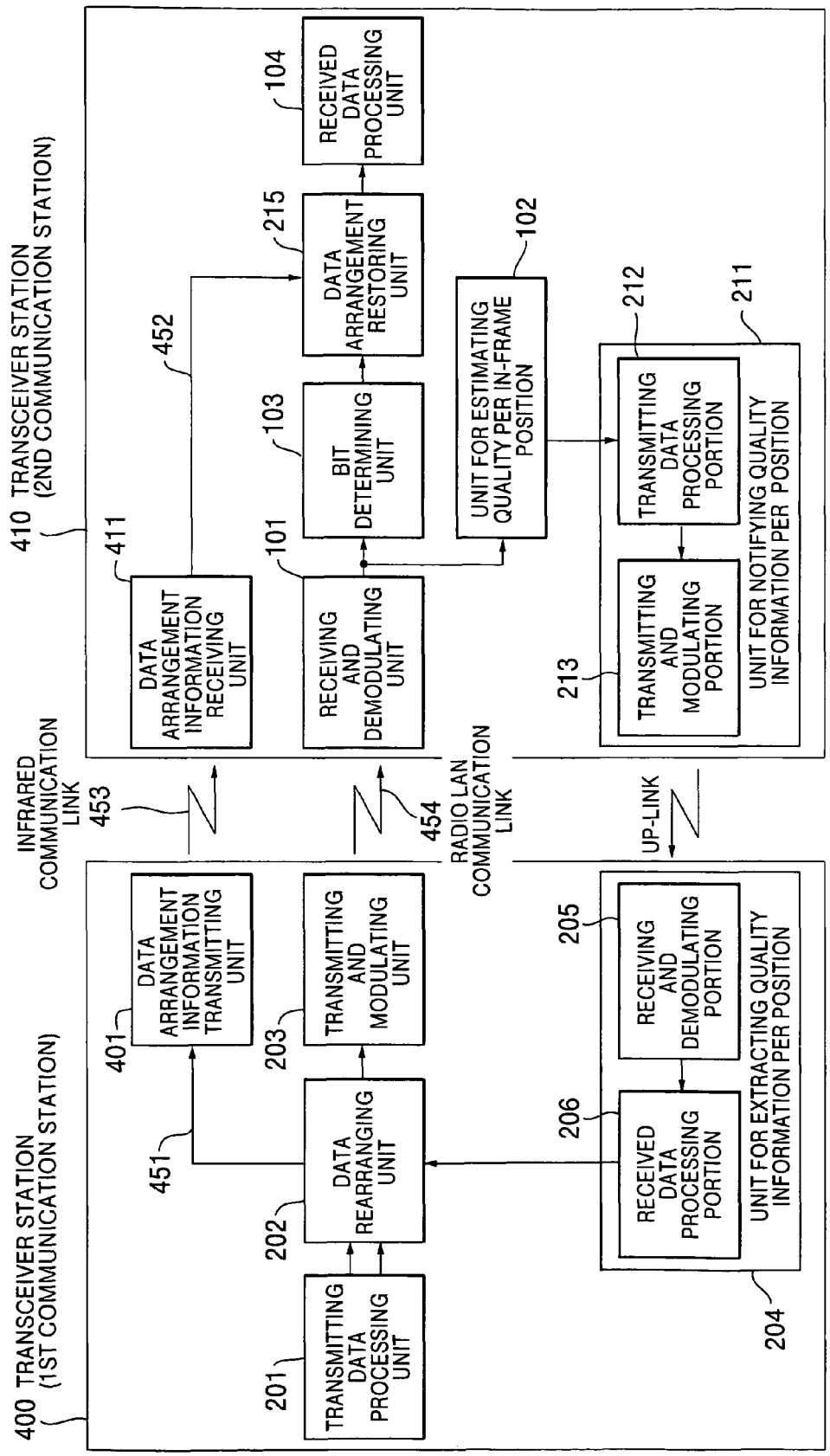
FIG. 9 is a block diagram showing one example of a communication system according to the fourth embodiment of the present invention.

Next, the fourth embodiment of the present invention will be described with reference to FIG. 9. FIG. 9 shows the configuration of a communication system according to the fourth embodiment. According to the fourth embodiment, the interactive communication is performed between a transceiver station 400 as a first communication station and a transceiver station 410 as a second communication station. In addition to a down-link communication system from the transceiver station 400 to the transceiver station 410, the communication system has a communication link for transmitting the data arrangement information from the transceiver station 400 to the transceiver station 410. Specifically, the transceiver station 400 has a data arrangement information transmitting unit 401, the transceiver station 410 has a data arrangement information receiving unit 411, and the rest of the configuration is the same as that shown in FIG. 3. Therefore, the same components as those shown in FIG. 3 are designated by the same reference numeral, a repeated description thereof is omitted, and only the data arrangement information transmitting unit 401 and the data arrangement information receiving unit 411 are described in detail hereinbelow.

The data arrangement information transmitting unit 401 transmits, to the transceiver station 410, information 451 on a rearrangement rule under which the sequence of the string of transmitting data is determined by the data rearranging unit 202 in the transceiver station 400. According to the fourth embodiment, the communication link to the transceiver station 400 is different from the communication link from the transmission and modulating unit 203 to the receiving and demodulating unit 101, with the high confidentiality and reliability. For example, the communication link from the transmitting and modulating unit 203 to the receiving and demodulating unit 101 is a radio LAN communication link 454, and the communication link from the data arrangement information transmitting unit 401 to the data arrangement information receiving unit 411 is an infrared communication link 453. The data arrangement information communicated by the infrared communication link 453 is, for example, subjected to the encryption processing based on individual ID information of the transceiver station 410 with the high confidentiality. The encryption processing is performed by the data arrangement information transmitting unit 401.

The data arrangement information receiving unit 411 receives the data arrangement information transmitted from the data arrangement information transmitting unit 401 and supplies obtained information 452 on the data arrangement to the data arrangement restoring unit 215. According to the fourth embodiment, the data arrangement information receiving unit 411 receives the signal transmitted by the infrared communication link 453 from the data arrangement information transmitting unit 401, and supplies the information 452 on the data arrangement to the data arrangement restoring unit 215.

The communication link is established in the infrared communication link 453 only when the transceiver stations 400 and 410 are located at the positions for the infrared communication link. Further, only during the establishment of the communication link, the data rearranging unit 202 updates the rule for arranging the data and transmits the obtained new data arrangement information.

In the communication system with the abovementioned configuration, the data arrangement information determined by the transceiver station 400 is notified to the transceiver station 410 by use of the infrared communication link 453 different from the normal data communication link 454, and it is further subjected to the encryption processing, thus preventing the interception of the data arrangement information in the data communication link 454 by another station. In addition, the confidentiality of the communication data is improved in the down-link 454 between the transceiver stations 400 and 410.

According to the fourth embodiment, the radio LAN is used for the data communication link 454, and the infrared communication system is used for the communication system 453 of the data arrangement information. However, the communication system is not limited to the foregoing. For example, a cellular communication system may be used for the data communication link 454 and a Bluetooth communication system for short distance may be used for the communication system 453 of the data arrangement information. Further, a communication system with a large capacity such as an FWA (Fixed Wireless Access) communication system may be used for the data communication link 454, a broadcasting-type communication system may be used for the communication system 453 of the data arrangement information, and a PAN (personal area network) may be used with the transmitting data in the broadcasting-type communication system, including the data arrangement information subjected to the encryption processing for the individual transceiver stations. Further, the combination of the above communication systems may be changed and used.

In addition, according to the fourth embodiment, as one example of the operation, the transceiver station 410, that is, a user of the radio LAN voluntarily goes to the position for establishing the infrared communication link 453 and obtains the data arrangement information. However, the operation is not limited to this.

(Fifth Embodiment)

Figure 10:
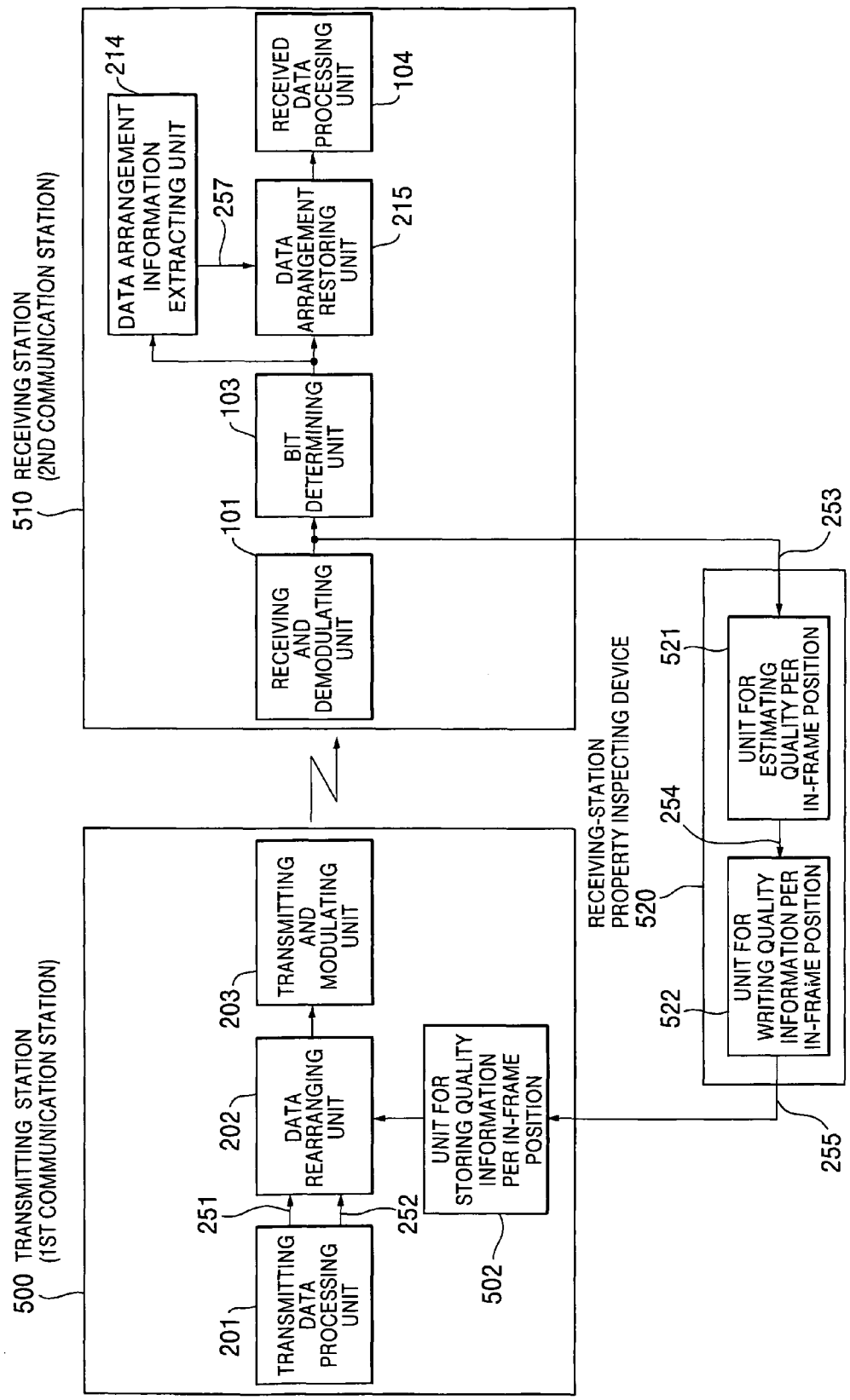
FIG. 10 is a block diagram showing one example of a communication system according to the fifth embodiment of the present invention.

Next, the fifth embodiment of the present invention will be described below with reference to FIG. 10. FIG. 10 shows the configuration of a communication system according to the fifth embodiment. According to the fifth embodiment, the radio communication is performed between a transmitting station 500 as a first communication station and a receiving station 510 as a second station. As mentioned according to the first embodiment, the property for the received signal quality which varies depending on the position in the communication frame caused in the communication from the transmitting station 500 to the receiving station 510 is previously measured at the timing for inspection before the shipment of products, and the obtained the data arrangement information is stored in the transmitting station 500. A description is given of the configuration and operation for transmitting and receiving the data based on the data arrangement information in the communication.

Referring to FIG. 10, the transmitting data processing unit 201 and the transmitting and modulating unit 203 in the transmitting station 500 have the same configuration and operation as those in the transceiver station 200 in FIG. 3.

A data rearranging unit 501 replaces the sequence of the string of transmitting data based on the inputted string of transmitting data and the importance information per portion thereof, rearranges and outputs the replaced sequence, and outputs information on the rearrangement as the data arrangement information. The fundamental configuration and operation are the same as those of the data rearranging unit 202 in FIG. 3.

A unit 502 for storing quality information per in-frame position stores information on the communication quality per bit position in the communication frame, and reads and outputs the stored information as needed. According to the fifth embodiment, the information is written when the unit 502 for storing quality information per in-frame position is connected to a receiving-station property inspecting device 520.

In the receiving station 510, the receiving and demodulating unit 101, the bit determining unit 103, the data arrangement information extracting unit 214, the data rearrangement restoring unit 215, and the received data processing unit 104 have the same configuration and operation as those in the transceiver station 210 in FIG. 3.

The receiving-station property inspecting device 520 inspects the communication performance in the receiving station 520. Further, the receiving-station property inspecting device 520 has various inspecting units in accordance with inspecting targets. According to the fifth embodiment, the receiving-station property inspecting device 520 includes at least a unit 521 for estimating the quality per in-frame position and a unit 522 for writing the quality information per in-frame position.

The unit 521 for estimating the quality per in-frame position estimates a received signal quality $Q_{ave}$ ($q_{a0}$, $q_{a1}$, $q_{a2}$, ..., $q_{aN-1}$) per bit position in the communication frame, and outputs the estimated quality information 254 per in-frame position. According to the fifth embodiment, similarly to the case according to the first embodiment, the receiving C/N ratio is estimated as one example of the parameter indicating the received signal quality. The unit 521 for estimating the quality per in-frame position has the same configuration as that of the unit 102 for estimating a quality per in-frame position shown in FIG. 2.

The unit 522 for writing the quality information per in-frame position temporarily stores the inputted quality information 254 per in-frame position, and writes temporarily-stored information 255 to the unit 502 for storing quality information per in-frame position in the transmitting station 500 when it is connected to the transmitting station 500.

With the communication system including the transmitting station 500 and the receiving station 510 having the above configuration, a description is given of the operation for previously estimating, during performance inspection, the variation in received signal quality per in-frame position caused by various property deteriorating factors in the processing from the transmission of the communication data from the transmitting station 500 to the reception in the receiving station 510, and is further given of the operation for using the estimating result in the subsequent communication.

In the performance inspection of the receiving station 510, the transmitting station 500 outputs the transmitting data 251 for performance inspection from the transmitting data processing unit 201. The data rearranging unit 501 does not perform the processing such as the rearrangement at this stage and supplies the transmitting data 251 to the transmitting and modulating unit 203. The transmitting and modulating unit 203 performs predetermined modulation and transmission processing, and transmits the information to the receiving station 510.

In the receiving station 510, the signal transmitted from the transmitting station 500 is selected and received by the receiving and demodulating unit 101, the demodulating result is supplied to the bit determining unit 103, and it is supplied to the device 520 for inspecting the performance of the receiving station.

The unit 521 for estimating the quality per in-frame position in the device 520 for inspecting the performance of the receiving station uses the IQ vector signal outputted from the receiving and demodulating unit 101, and measures the C/N ratio as the received signal quality per bit position in the frame of the received signal. Here, the unit 521 for estimating the quality per in-frame position performs the estimation of the quality per in-frame position similar to that according to the second embodiment. Thus, the unit 521 for estimating the quality per in-frame position determines the parameters classified into the five ranks as the quality per in-frame position, and the unit 522 for writing the quality information per in-frame position temporarily stores the determined parameters. The performance inspection of the receiving station 510 ends and, then, the device 520 for inspecting the performance of the receiving station is connected to the transmitting station 500, thereby writing, to the unit 502 for storing quality information per in-frame position in the transmitting station 500, the quality information per bit position which is temporarily stored in the unit 522 for writing the quality information per in-frame position.

After that, the radio communication from the transmitting station 500 to the receiving station 510 uses the transmitting data 251 supplied from the transmitting data processing unit 201, the importance information 252, and the quality information per bit position which is stored in the unit 502 for storing quality information per in-frame position. The transmitting data is rearranged similarly to the case of the data rearranging unit 202 shown in FIG. 3. Thus, the rearranged string $D_{T2}$ of the data is obtained, and information R on the data arrangement is generated. The information R on the data arrangement and the string $D_{T2}$ of the transmitting data are transmitted by the transmitting and modulating unit 203, and are notified to the receiving station 510.

In the receiving station 510, the signal received by the receiving and demodulating unit 101 is received and demodulated, the bit of the signal is determined by the bit determining unit 103, and the obtained string 256 of the received data is supplied to the data arrangement information extracting unit 214 and is supplied to the data arrangement restoring unit 215. The data arrangement information extracting unit 214 extracts, from a predetermined position in the string 256 of the received data, information 257 on the data arrangement indicating the rearrangement of the string of transmitting data in the data rearranging unit 501, and supplies the extracted information to the data arrangement restoring unit 215. The data arrangement restoring unit 215 rearranges the sequence of the string 256 of the received data based on the supplied information 257 on the data arrangement, thereby restoring the sequence of the data-string similarly to the transmitting data.

As mentioned above, in the communication system according to the fifth embodiment, the transmitting station 500 previously measures and stores the property of the received signal quality varied depending on the position in the communication frame in the communication from the transmitting station 500 to the receiving station 510. Then, during the communication, the sequence of transmitting data is rearranged based on the stored information on the quality per position and the importance information of the transmitting data. The receiving station 510 restores the data arrangement in accordance with the rearrangement and, thus, the transmitting data with the higher importance is arranged at the position with the higher communication-reliability and is then communicated in accordance with the variation in received signal quality depending on the in-frame position due to the various factors. Further, the communication services are improved. In the property of the received signal quality caused in the communication frame, particularly, the deteriorated property which has already been found is previously inspected and is stored and, consequently, the receiving station 510 does not need to estimate the received signal quality in the actual communication. Therefore, the configuration of the receiving station 510 can be simplified.

In the configuration shown in FIG. 10 according to the fifth embodiment, the quality information per in-frame position estimated by the unit 522 for writing the quality information per in-frame position in the device 520 for inspecting the performance of the receiving station is temporarily stored, and therefore the simultaneous establishment is not necessary between the connection of the receiving station 510 and the device 520 for inspecting the performance of the receiving station as well as the connection of the transmitting station 500 and the device 520 for inspecting the performance of the receiving station. However, the temporary storing function of the unit 522 for writing the quality information per in-frame position may be omitted with the configuration and operation in the abovementioned simultaneous establishment of both the connections.

The transmitting station used for the performance inspection has the same configuration as that of the transmitting station which stores the quality information per in-frame position, rearranges the data, and transmits the data. However, it necessarily does not have the same configuration as that. For example, the transmitting station used for the performance inspection may directly supply and transmit, to the transmitting and modulating unit 203, the transmitting data outputted from the transmitting data processing unit 201. The same configuration may not be provided for the transmitting station for then storing the quality information per in-frame position, rearranging the data, and transmitting the data and for the transmitting station 500.

(Sixth Embodiment)

Figure 11:
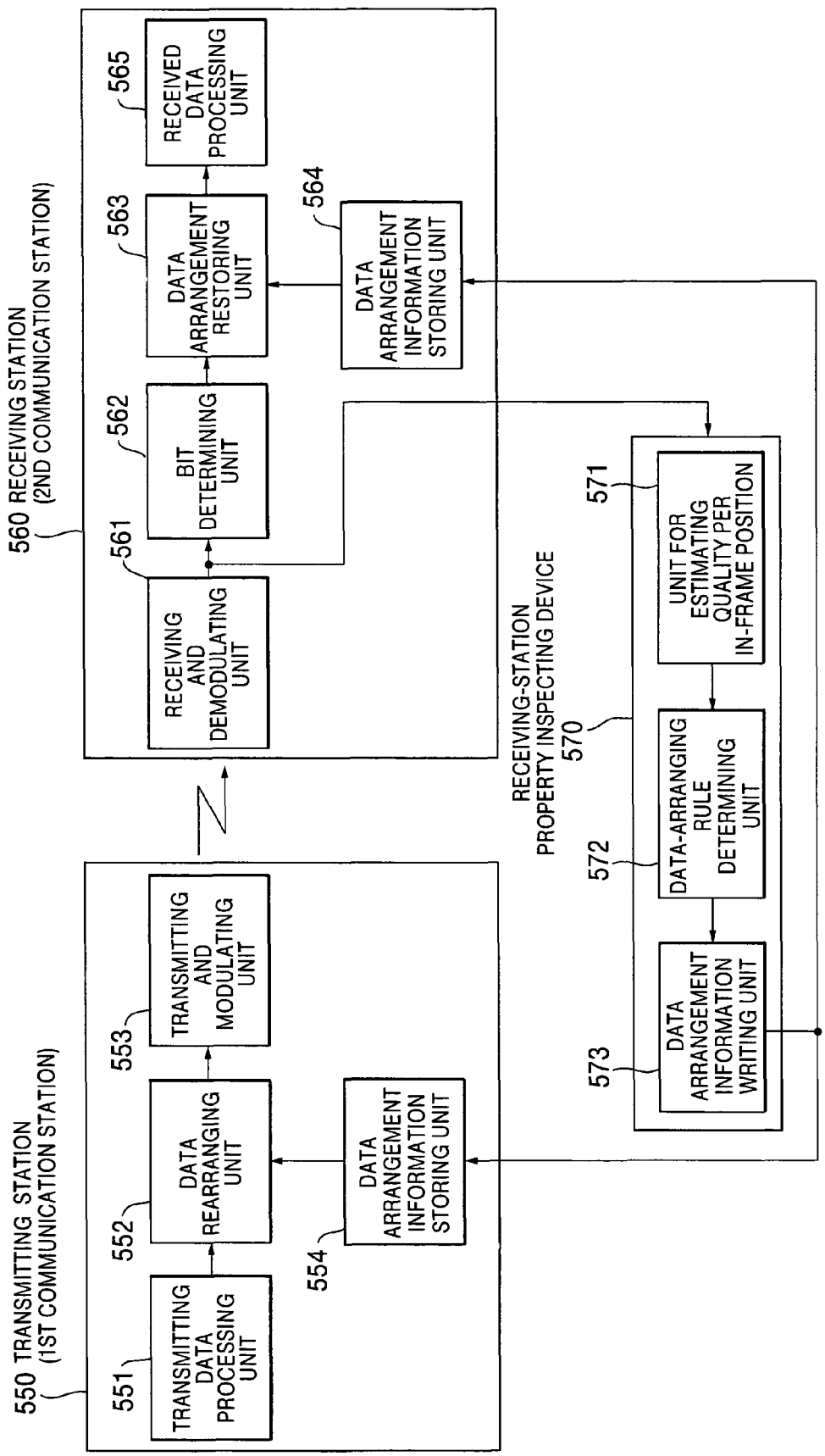
FIG. 11 is a block diagram showing one example of a communication system according to the sixth embodiment of the present invention.

Next, the sixth embodiment of the present invention will be described with reference to FIG. 11. FIG. 11 shows the configuration of a communication system according to the sixth embodiment. According to the sixth embodiment, the communication system according to the fifth embodiment is modified as a preferred example, in which the change in arrangement is prevented in the configuration of the transmitting data from the transmitting station.

In a device 570 for inspecting the performance of the receiving station, a unit 571 for estimating the quality per in-frame position estimates the quality per position in the communication frame, further, a data-arranging rule determining unit 572 determines the data arranging rule upon transmitting the data from a transmitting data processing unit 551 in a transmitting station 550, and a data arrangement information writing unit 573 transmits and stores the determined data arrangement information to a data arrangement information storing unit 554 in the transmitting station 550 and a data arrangement information storing unit 564 in the receiving station 560.

Upon transmitting the data from the transmitting station 550, a data rearranging unit 522 rearranges the transmitting data from the transmitting data processing unit 551 and the data arrangement information from the data arrangement information storing unit 554, and the transmitting and modulating unit 553 performs predetermined modulation and transmission processing of the rearranged data and transmits the data to the receiving station 560.

In the receiving station 560, the signal transmitted from the transmitting station 550 is demodulated by the receiving and demodulating unit 561, the demodulating result is supplied to the device 570 for inspecting the performance of the receiving station in the performance inspection, and it is supplied to a bit determining unit 562 in the data transmission. The string of the received data obtained by the bit determining unit 562 is supplied to a data arrangement restoring unit 563. The data arrangement restoring unit 563 restores the data arrangement by use of the data arrangement information which is stored in the data arrangement information storing unit 564, thus restoring the sequence of the string of data similarly to the transmitting data.

As mentioned above, in the communication system according to the sixth embodiment, without changing the importance arrangement of the data transmitted from the transmitting station, the unit 571 for estimating the quality per in-frame position in the device 570 for inspecting the performance of the receiving station estimates the quality per position in the communication frame and the data-arranging rule determining unit 572 further determines the data arranging rule upon transmitting the data from the transmitting data processing unit 551 in the transmitting station 550. Furthermore, the data arrangement information writing unit 573 transmits and stores the determined data arrangement information to the data arrangement information storing unit 554 in the transmitting station 550 and to the data arrangement information storing unit 564 in the receiving station 560. Therefore, as compared with the case according to the fifth embodiment, the configuration of the receiving station 560 can be simplified.

The present invention has been described according to the preferred embodiments with reference to the drawings, and those in the art can apparently understand that the present invention can easily be modified and changed without departing the spirit and the scope of the present invention. The present invention includes such modifications.

What is claimed is:

1. A receiving method comprising:
 receiving a signal modulated by a multivalue modulating method as a received signal, the received signal including a plurality of bit sets, each of the bit sets including a plurality of bits arranged in respective ordered bit positions within each of the bit sets,
 identifying one of the respective bit positions in each of the plurality of bits sets based on the ordered bit positions within each of the plurality of bit sets,
 determining, for the identified one of the respective bit positions within each of the plurality of bit sets, a respective parameter indicating a received signal quality per bit position,
 averaging the respective parameter indicating the received signal quality per bit position for the one of the identified bit positions over the plurality of bit sets to obtain an average parameter,
 processing, by a processing unit, received data by use of said average parameter.

2. The receiving method according to claim 1, wherein in said processing the received data, data at one of said identified one of the respective bit positions where the respective parameter indicating the received signal quality per bit position is lower than a predetermined received signal quality, which is estimated based on of said respective parameter indicating the received signal quality per bit position, is cancelled.

3. The receiving method according to claim 1, wherein in said processing the received data, soft determining information on a receiving and demodulating result is weighted based on said respective parameter indicating the received signal quality per bit position.

4. The receiving method according to claim 1, wherein the average parameter is classified into a plurality of ranks and the obtained ranks are used as signal quality per bit position;
 wherein a string of transmitted data is classified into categories based on importance; and
 wherein the string of transmitted data is arranged in a sequence such that the transmitted data belonging to a category of more important is arranged at a position of higher rank with respect to quality.

5. The receiving method according to claim 1, wherein the respective parameter indicating the received signal quality per bit position is C/N ratio per bit in a frame or a receiving bit error ratio.

6. A communication system for transferring data from a first communication station to a second communication station, wherein said first communication station comprises:

transmitting data processing means which generate a string of transmitting data and simultaneously output importance information of the string of transmitted data; and data rearranging means which rearrange a sequence of the string of transmitting data and output a transmitted data frame based on an average parameter notified from said second communication station, said string of transmitted data, and said importance information; and first transmitting and modulating means which perform predetermined modulation processing and transmission of the transmitted data frame outputted from said data rearranging means; and wherein said second communication station comprises:

a receiving apparatus including a quality estimating unit configured to receive a signal modulated by a multivalue modulating method as a received signal, the received signal including a plurality of bit sets, each of the bit sets including a plurality of bits arranged in respective ordered bit positions within each of the bit sets, identify one of the respective bit positions in each of the bits sets based on the ordered bit positions within each bit set, determine, for the identified one of the respective bit positions within each of the bit sets, a respective parameter indicating a received signal quality per bit position, average the respective parameter indicating the received signal quality per bit position for the one of the identified bit positions over the plurality of bit sets to obtain an average parameter;

a received data processing unit which processes the received signal by use of said average parameter;

a quality information notifier which notifies said first communication station of the average parameter; and wherein said first communication station further comprises a quality information extractor that receives the average parameter received from said second communication station and extracts the average parameter; and wherein in said first communication station, codec processing of the transmitting data is performed by said transmitting data processing means or said first transmitting and modulating means, interleave processing in said codec processing is performed by said data rearranging means, and a pattern of said interleaves is dynamically changed in accordance with the average parameter.

7. The communication system according to claim 6, wherein said first communication station further comprises, as said quality information notifier, return link transmitting means which perform transmission processing of a radio communication link from said second communication station to said first communication station, and said return link transmitting means transmit transmitting data and the average parameter.

8. The communication system according to claim 6, wherein said quality information notifier comprise;

a transmitting data processing unit which forms a transmitting data frame and outputs the transmitting data frame by use of transmitting data from said second communication station to said first communication station and said average parameter; and a second transmitting and modulating unit which processes and transmits predetermined modulation processing of said transmitting data frame.

9. The communication system according to claim 6, wherein said quality information extractor comprise:

receiving and demodulating means which receive and demodulate a signal transmitted from said second communication station and output a receiving and demodulating result; and a second received data unit which extracts the average parameter from said receiving and demodulating result in said second communication station and supplies the extracted average parameter to data rearranging means.

10. The communication system according to claim 6, wherein the receiving apparatus, the average parameter is classified into a plurality of ranks and the obtained ranks are used as signal quality information per bit position;

wherein a string of transmitted data is classified into categories based on importance; and wherein the transmitted data is arranged in a sequence such that the transmitted data belonging to a category of more important is arranged at a position of higher rank with respect to quality.

11. The communication system according to claim 6, wherein the respective parameter indicating the received signal quality per bit position is C/N ratio per bit in a frame or a receiving bit error ratio.

12. A transmitting apparatus comprising:

a transmitting data processing unit which generates a string of transmitting data and simultaneously outputs importance information of the string of transmitting data;

a quality information extracting unit which extracts a signal quality information per bit position notified from a receiving apparatus, the receiving apparatus having a quality estimating unit configured to receive a signal modulated by a multivalue modulating method as a received signal, the received signal including a plurality of bit sets, each of the bit sets including a plurality of bits arranged in respective ordered bit positions within each of the bit sets, wherein one of the respective bit positions in each of the bits sets is identified based on the ordered bit positions within each bit set, for the identified one of the respective bit positions within each of the bit sets, a respective parameter indicating a received signal quality per bit position is determined, and the respective parameter indicating the received signal quality per bit position for the one of the identified bit positions is averaged over the plurality of bit sets to obtain an average parameter;

a data rearranging unit which rearranges a sequence of the string of transmitting data and outputs a transmitting data frame based on the average parameter, the string of transmitting data, and the importance information; and a transmitting and modulating unit which performs predetermined modulation processing and transmitting of the transmitting data frame outputted from said data rearranging unit.

13. The transmitting apparatus according to claim 12, wherein said transmitting and modulating unit transmits data arrangement information which is a result of rearrangement performed by said data rearranging unit.

14. The transmitting apparatus according to claim 12, wherein the average parameters is classified into a plurality of ranks and the obtained ranks are used as the signal quality information per bit position;

wherein a string of transmitted data is classified into categories based on importance; and wherein the string of transmitted data is arranged in a sequence such that the transmitted data belonging to a category of more important is arranged at a position of higher rank with respect to quality.

15. The transmitting apparatus according to claim 12, wherein the respective parameter indicating the received signal quality per bit position is C/N ratio per bit in a frame or a receiving bit error ratio.

* * * * *